United States Patent

Rechtziegel et al.

Patent Number: 5,270,001
Date of Patent: Dec. 14, 1993

[54] ALLOY, IN PARTICULAR FOR USE IN THE MANUFACTURE OF JEWELRY, FRAMES FOR GLASS, AND THE LIKE

[75] Inventors: Bruno Rechtziegel, Heuchelheim; Wolfgang Brandstaetter, Oberursel; Juergen Fackert, Steffenberg; Klaus Tauber, Biebertal, all of Fed. Rep. of Germany

[73] Assignee: Berkenhoff GmbH, Heuchelheim, Fed. Rep. of Germany

[21] Appl. No.: 947,335

[22] Filed: Sep. 18, 1992

[30] Foreign Application Priority Data

Sep. 20, 1991 [DE] Fed. Rep. of Germany ....... 4131426

[51] Int. Cl.$^5$ ............................ C22C 9/04; C22C 9/01
[52] U.S. Cl. .................................... 420/480; 148/434; 148/436
[58] Field of Search ................. 420/480; 148/434, 436

[56] References Cited

U.S. PATENT DOCUMENTS

| | | | |
|---|---|---|---|
| 2,400,234 | 5/1946 | Hudson | 148/434 |
| 2,494,736 | 1/1950 | Berwick | 148/434 |
| 3,998,633 | 12/1976 | Rhoes | 75/162 |
| 4,493,736 | 1/1985 | Adams | 148/2 |
| 4,642,146 | 2/1987 | Ashok et al. | 420/480 |

FOREIGN PATENT DOCUMENTS

| | | |
|---|---|---|
| 0119501 | 9/1984 | European Pat. Off. |
| 2626251 | 1/1977 | Fed. Rep. of Germany |
| 3626435 | 3/1988 | Fed. Rep. of Germany |
| 3834186 | 4/1990 | Fed. Rep. of Germany |
| 9017408.9 | 12/1990 | Fed. Rep. of Germany |

*Primary Examiner*—R. Dean
*Assistant Examiner*—Sikyin Ip
*Attorney, Agent, or Firm*—Flynn, Thiel, Boutell & Tanis

[57] ABSTRACT

An alloy, in particular for use in the manufacture of jewelry, frames for glasses, and the like. In order to be able to manufacture jewelry, frames for glasses, and the like of a nickel-free alloy inexpensively and well, the following alloy has been produced according to the invention, which, in percentages by weight, has the following composition: Cu 86.0–90.0 percent, Al 2.8–4.5 percent, Mn 0.4–1.3 percent, Fe 1.0–2.5 percent, Si 0–0.5 percent, the remainder being Zn.

10 Claims, No Drawings

ALLOY, IN PARTICULAR FOR USE IN THE MANUFACTURE OF JEWELRY, FRAMES FOR GLASS, AND THE LIKE

FIELD OF THE INVENTION

The invention relates to an alloy which is used in particular in the manufacture of jewelry, frames for glasses, for metal parts to be worn on the body or attached to clothing and tooth brushes, and the like. The invention relates furthermore to jewelry and frames for glasses which are produced by using the alloy, and in-between products and blanks, for example wire for glasses, for the manufacture of jewelry and frames for glasses or parts thereof.

BACKGROUND OF THE INVENTION

Different criteria must be met for the manufacture of jewelry, frames for glasses, metal parts to be worn on the body or clothing, in order to be able to utilize the product in practice. The manufactured products must, on the one hand, be sufficiently strong, on the other hand, the optical demands must be met. The problems of strength exist in particular in the case of frames for glasses, for example in the frames around the lenses or the temples. It is also absolutely essential for other jewelry, for example pins, rings, earrings, chains, bands or others that the alloy has given strength factors in order to avoid mechanical damage thereto. Furthermore, physical characteristics must be met for certain uses, for example with respect to heat conductivity, coefficient of linear expansion, electrical resistance and electrical conductivity. A further criteria for selecting such an alloy is its manufacturing capability. The alloy is supposed to be both easily pourable in order to facilitate manufacture of the necessary blanks, for example through extrusion or casting in molds, and also be moldable in order to be able to create out of the alloy, for example, rods, wires, bands or similar items. Alloys, which partly or completely meet the above requirements, are for example described in Gebrauchsmuster 90 17 408.9 or the DE-OS 38 34 186. Also DE-PS 26 26 251 describes such an alloy.

The mentioned alloys are distinguished altogether by containing a relatively high nickel content. This nickel content is increasingly undesired in jewelry, frames for glasses and similar articles which are worn directly on the skin, since many people are allergic to nickel. Among others, caused by the increasing environmental burden, the percentage of the population suffering from such allergies is increasing so that nickel-containing alloys are more and more not accepted by customers. Help exists in some cases due to coatings or envelopes, however, this is not possible in most cases of use.

The purpose of the invention is to provide an alloy of the above-mentioned type which can be manufactured inexpensively and easily, has high mechanical strengths and no nickel content.

SUMMARY OF THE INVENTION

The purpose is attained according to the invention by providing an alloy which, in percentages by weight, has the following composition: 86.0–90.0 percent copper, 2.8–4.5 percent aluminum, 0.4–1.3 percent manganese, 1.0–2.5 percent iron, 0–0.5 percent silicon, the remainder being zinc.

DETAILED DESCRIPTION

The alloy of the invention is distinguished by a number of significant advantages. The invention for the first time provides an alloy which has very good mechanical strength characteristics and a good corrosion resistance, which can be processed in the usual manner and has no nickel content. The alloy of the invention can thus be utilized in particular for jewelry, frames for glasses or similar items without causing the wearers or users to develop allergic reactions to nickel. Thus, according to the invention, the finished product does not require any of the protective measures known from the state of the art, as for example coatings, lacquers or others for preventing a direct contact of the known nickel-containing alloys with the skin. Thus, the alloy of the invention enables a simple, inexpensive manufacture of the respective products. On the other hand, this alloy is also suited for nonnickel-containing coatings, for example for decoration purposes.

The alloy of the invention is distinguished in particular by a good cold-forming property and very good elastic characteristics. Also the processing capability, for example through hard-soldering or welding is good. Also very good values for the tensile strength (in the elastic state 970–1030 N/mm2) and good hardness numbers of up to 280 HV are achieved.

A particularly preferred embodiment of the invention provides that the alloy has the following composition, in percentages by weight: 86.0–88.0 percent copper, 3.8–4.2 percent aluminum, 0.7–1.0 percent manganese, 1.0–1.3 percent iron, 0 percent silicon, the remainder being zinc. The following composition can also be preferred: 87.0–89.0 percent copper, 3.6–4.0 percent aluminum, 0.7–1.0 percent manganese, 1.7–2.0 percent iron, 0.3–0.5 percent silicon, the remainder being zinc (all information is in percentage by weight). The alloy of a further advantageous development of the invention has the following composition (in percentages by weight): 86.0–88.0 percent copper, 4.0–4.4 percent aluminum, 0.8–1.1 percent manganese, 1.8–2.1 percent iron, 0 percent silicon, the remainder being zinc.

In addition to the above-named advantages, the alloys of the invention have very good elastic characteristics, also good values for corrosion resistance. The alloys are thus particularly suited for the manufacture of frames for glasses.

The invention is not to be limited to the described alloy compositions, but rather many possibilities for modifications and changes within the scope of the invention will be apparent to the man skilled in the art.

The embodiments of the invention in which an exclusive property or privilege is claimed are defined as follows:

1. An alloy useful in the manufacture of jewelry, frames for glasses, metal parts to be worn on the body or attached to clothing and tooth brushes, and the like consisting essentially of, in percentages by weight:

| | |
|---|---|
| Cu | 86.0–90.0% |
| Al | 2.8–4.5% |
| Mn | 0.4–1.3% |
| Fe | 1.0–2.5% |
| Si | 0–0.5% |

Zn the remainder, said alloy being free of Ni.

2. An alloy useful in the manufacture of jewelry and frames for glasses, consisting essentially of, in percentages by weight:

| | |
|---|---|
| Cu | 86.0–88.0% |
| Al | 3.8–4.2% |
| Mn | 0.7–1.0% |
| Fe | 1.0–1.3% |
| Si | 0% |

Zn the remainder, said alloy being free of Ni.

3. An alloy useful in the manufacture of jewelry and frames for glasses, consisting essentially of, in percentages by weight:

| | |
|---|---|
| Cu | 87.0–89.0% |
| Al | 3.6–4.0% |
| Mn | 0.7–1.0% |
| Fe | 1.7–0.5% |
| Si | 0.3–0.5% |

Zn the remainder, said alloy being free of Ni.

4. An alloy useful in the manufacture of jewelry and frames for glasses, consisting essentially of, in percentages by weight:

| | |
|---|---|
| Cu | 86.0–88.0% |
| Al | 4.0–4.4% |
| Mn | 0.8–1.1% |
| Fe | 1.8–2.1% |
| Si | 0% |

Zn the remainder, said alloy being free of Ni.

5. Jewelry comprising the alloy according to one of the claims 1–4.

6. An eyeglass frame or frame component comprising the alloy according to one of the claims 1–4.

7. Metallic part for clothing comprising the alloy according to one of claim 1–4.

8. Metallic bond comprising the alloy according to one of claims 1–4.

9. Metallic wire comprising the alloy according to one of claims 1–4.

10. Metallic rod comprising the alloy according to one of claims 1–4.

* * * * *

UNITED STATES PATENT AND TRADEMARK OFFICE
CERTIFICATE OF CORRECTION

PATENT NO. : 5 270 001
DATED : December 14, 1993
INVENTOR(S) : Bruno Rechtziegel et al It is certified that error appears in the above-identified patent and that said Letters Patent is hereby corrected as shown below:

On the title page, Section [54]:
    line 3 of the title; change "GLASS," to ---GLASSES,---.

Column 3, line 21; change "Fe    1.7-0.5%" to
                    ---Fe    1.7-2.0%---.

Column 4, line 17; change "claim 1-4." to ---claims 1-4.---.
    line 18; change "bond" to ---band---.

Signed and Sealed this

Seventeenth Day of May, 1994

*Attest:*

BRUCE LEHMAN

*Attesting Officer*      *Commissioner of Patents and Trademarks*